US011822415B1

(12) United States Patent
Chung et al.

(10) Patent No.: US 11,822,415 B1
(45) Date of Patent: Nov. 21, 2023

(54) SYSTEM AND METHOD OF OPERATING A POWER SYSTEM OF AN INFORMATION HANDLING SYSTEM

(71) Applicant: Dell Products L.P., Round Rock, TX (US)

(72) Inventors: Hao-Yu Chung, Taoyuan (TW); Chun-Yen Lu, Taipei (TW)

(73) Assignee: Dell Products L.P.

( * ) Notice: Subject to any disclaimer, the term of this patent is extended or adjusted under 35 U.S.C. 154(b) by 0 days.

(21) Appl. No.: 17/816,149

(22) Filed: Jul. 29, 2022

(51) Int. Cl.
*G06F 1/32* (2019.01)
*G06F 1/3287* (2019.01)
*G06F 1/3212* (2019.01)
*G06F 1/3296* (2019.01)

(52) U.S. Cl.
CPC .......... *G06F 1/3287* (2013.01); *G06F 1/3212* (2013.01); *G06F 1/3296* (2013.01)

(58) Field of Classification Search
CPC ..... G06F 1/3287; G06F 1/3212; G06F 1/3296
See application file for complete search history.

(56) References Cited

U.S. PATENT DOCUMENTS

| 11,334,135 B1* | 5/2022 | Wang ................. G06F 1/263 |
| 2012/0086276 A1* | 4/2012 | Sawyers ............... H02J 1/12 |
| | | 307/66 |
| 2020/0004306 A1* | 1/2020 | Uan-Zo-li ............ G06F 1/26 |

* cited by examiner

*Primary Examiner* — Stefan Stoynov
(74) *Attorney, Agent, or Firm* — McDermott Will & Emery LLP (57) ABSTRACT

In one or more embodiments, one or more systems, one or more methods, and/or one or more processes may: determine a difference between a first voltage value associated with an electrical power output of a power system of an information handling system (IHS) and a second voltage value associated with a battery system of the IHS is greater than a first voltage value threshold; turn a first switch on to conduct electrical power from the battery system to an electrical power output of the power system; set a voltage value associated with the electrical power output to a voltage value associated with the battery system; permit an amount of time to transpire; determine a difference between a third voltage value associated with the electrical power output and a fourth voltage value associated with the battery system is less than a second voltage value threshold; and turn the first switch off.

20 Claims, 5 Drawing Sheets

SYSTEM AND METHOD OF OPERATING A POWER SYSTEM OF AN INFORMATION HANDLING SYSTEM

BACKGROUND

Field of the Disclosure

This disclosure relates generally to information handling systems and more particularly to operating a power system of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may determine that a difference between a first voltage value associated with an electrical power output of a power system of an information handling system and a second voltage value associated with a battery system of the information handling system is greater than a first voltage value threshold; may turn a first switch on to conduct electrical power from the battery system to the electrical power output of the power system; may set a voltage value associated with the electrical power output to a voltage value associated with the battery system; after setting the voltage value associated with the electrical power output, may permit an amount of time to transpire; after the amount of time transpires, may determine that a difference between a third voltage value associated with the electrical power output and a fourth voltage value associated with the battery system is less than a second voltage value threshold; and may turn the first switch off to prohibit conducting electrical power from the battery system to the electrical power output of the power system. In one example, the first voltage value threshold may be one hundred and fifth millivolts (150 mV). In another example, the amount of time may be one second.

In one or more embodiments, the one or more systems, the one or more methods, and/or the one or more processes may further set the voltage value associated with the electrical power output to a sum of the voltage value associated with the battery system and a constant voltage value. For example, the constant voltage value may be fifty millivolts (50 mV). In one or more embodiments, the one or more systems, the one or more methods, and/or the one or more processes may further determine that an alternating current (AC) power input to the information handling system and the battery system are at one hundred percent (100%). In one or more embodiments, the information handling system may be configured to be readily carried by a user. For example, the information handling system may be at least one of a laptop computer system and a tablet computer system. In one or more embodiments, the one or more systems, the one or more methods, and/or the one or more processes may further, after turning the first switch on, turn on a second switch of the battery system to conduct electrical power from the battery system to the first switch. In one or more embodiments, the power system may include an analog to digital converter. For example, the one or more systems, the one or more methods, and/or the one or more processes may further determine, via the analog to digital converter, the first voltage value associated with the electrical power output of the power system.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

Figure 1:
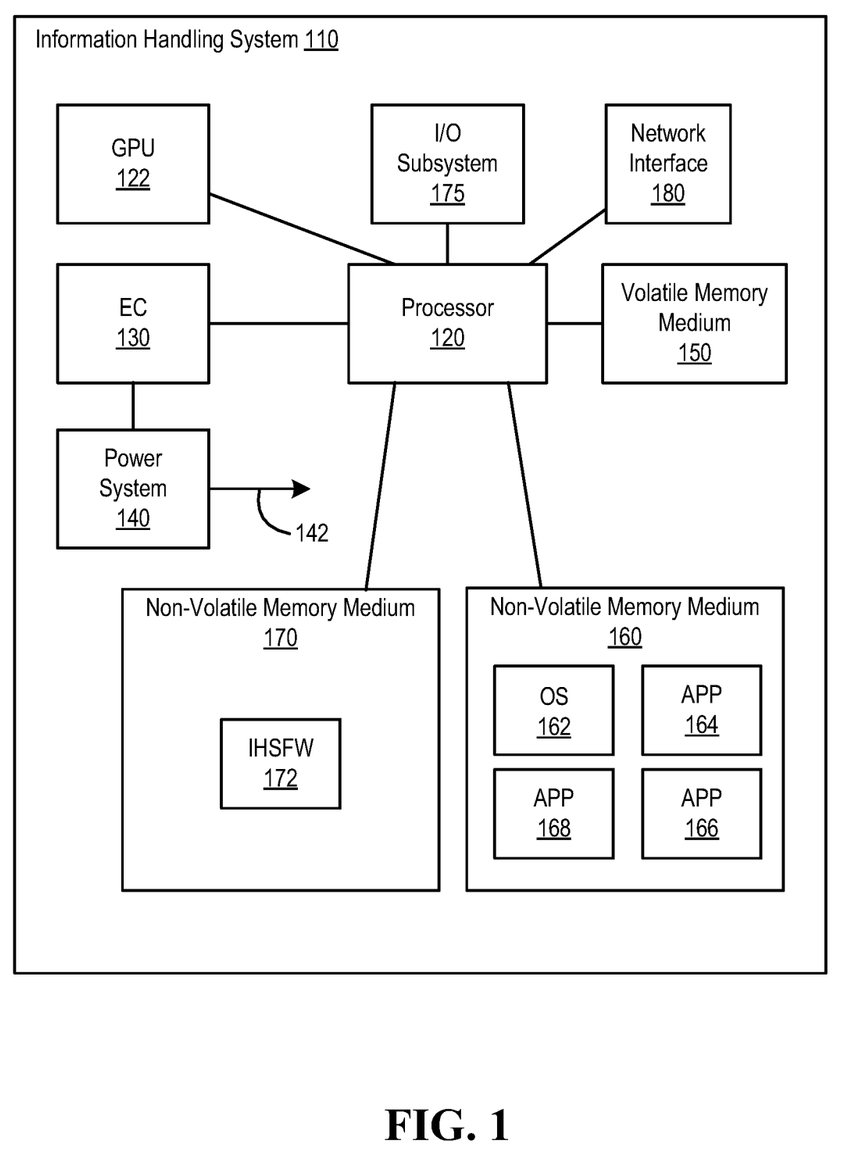
FIG. 1 illustrates an example of an information handling system, according to one or more embodiments.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a graphics processing unit (GPU) 122, an embedded controller (EC) 130, a volatile memory medium 150, non-volatile memory media 160 and 170, an I/O subsystem 175, and a network interface 180. As illustrated, GPU 122, EC 130, volatile memory medium 150, non-volatile memory media 160 and 170, I/O subsystem 175, and network interface 180 may be communicatively coupled to processor 120.

In one or more embodiments, one or more of GPU 122, EC 130, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of GPU 122, EC 130, volatile memory medium 150, non-volatile memory media 160 and 170, I/O subsystem 175, and network interface 180 may be communicatively coupled to processor 120 via one or more PCI-Express (PCIe) root complexes. In another example, one or more of EC 130, I/O subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

In one or more embodiments, EC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, EC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 130 may be or include an application processor. In one example, EC 130 may be or include an ARM Cortex-A processor. In another example, EC 130 may be or include an Intel Atom processor. In one or more embodiments, EC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

In one or more embodiments, an information handling system may include a power system. For example, IHS 110 may include a power system 140. For instance, power system 140 may provide electrical power to one or more components of IHS 110. As an example, the one or more components of IHS 110 processor 120, EC 130, volatile memory medium 150, non-volatile memory media 160 and 170, I/O subsystem 175, and network interface 180, among others. In one or more embodiments, power system 140 may provide electrical power to the one or more components of IHS 110 via an electrical power output 142. For example, electrical power output 142 may provide electrical power via a voltage value. For instance, electrical power output 142 may be utilized to produce other voltage values. In one or more embodiments, power system 140 may be communicatively coupled to EC 130. For example, power system 140 may be communicatively coupled to EC 130 via a bus. For instance, the bus may be or include a SMBus.

Figure 2:
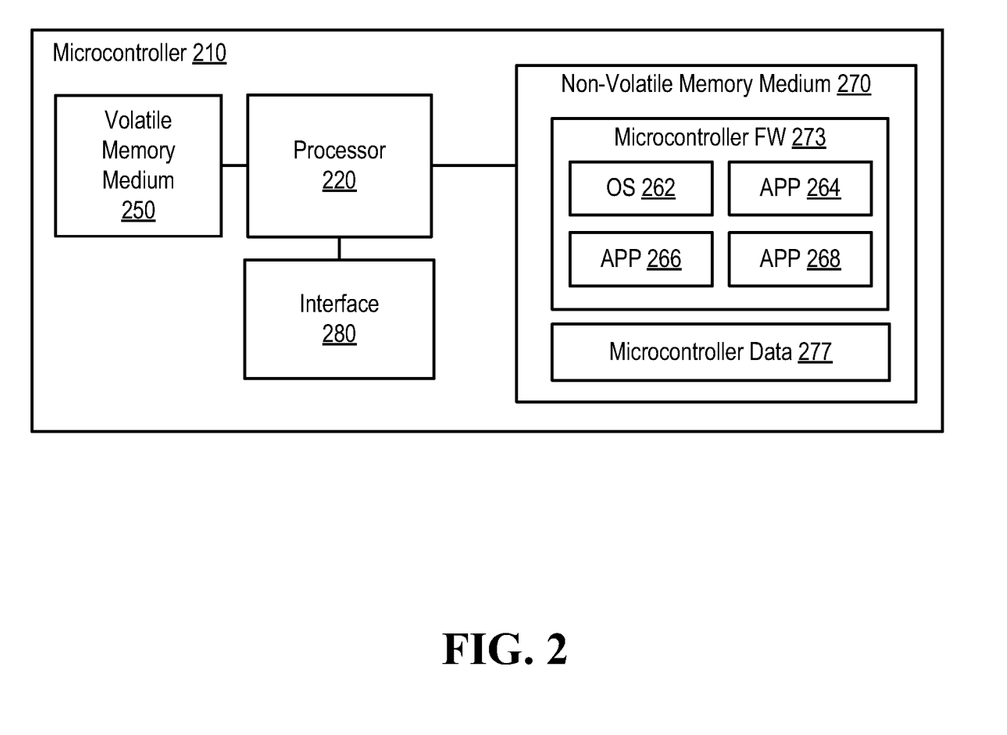
FIG. 2 illustrates an example of a microcontroller, according to one or more embodiments.

Turning now to FIG. 2, an example of a microcontroller is illustrated, according to one or more embodiments. In one or more embodiments, microcontroller 210 may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. As shown, microcontroller 210 may include a processor 220, a volatile memory medium 250, a non-volatile memory medium 270, and an interface 280. As illustrated, non-volatile memory medium 270 may include a microcontroller FW 273, which may include an OS 262 and APPs 264-268, and may include microcontroller data 277. In one example, OS 262 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In another example, OS 262 may be or include a POSIX compliant operating system.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include GPIO circuitry, and the GPIO circuitry may enable one or more interrupt signals to be received and/or provided via at least one interrupt line. In another instance, interface 280 may include GPIO circuitry that may enable microcontroller 210 to provide and/or receive signals associated with other circuitry. In a third example, interface 280 may include circuitry that enables communicatively coupling to one or more networks. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, at least a portion of one or more flowcharts, one or more methods, and/or at least a portion of one or more processes described herein. For example, non-volatile memory medium 270 and/or volatile memory medium 250 may store instructions that may be executable in accordance with at least a portion of one or more systems, at least a portion of one or more flowcharts, at least a portion of one or more methods, and/or at least a portion of one or more processes described herein. In one or more embodiments, processor 220 may execute instructions in accordance with at least a portion of one or more of systems, flowcharts, at least a portion of one or more methods, and/or at least a portion of one or more processes described herein. For example, non-volatile memory medium 270 and/or volatile memory medium 250 may store instructions that may be executable in accordance with at least a portion of one or more of systems, at least a portion of one or more flowcharts, at least a portion of one or more methods, and/or at least a portion of one or more processes described herein. In one or more embodiments, processor 220 may utilize microcontroller data 277. In one example, processor 220 may utilize microcontroller data 277 via non-volatile memory medium 270. In another example, one or more portions of microcontroller data 277 may be transferred to volatile memory medium 250, and processor 220 may utilize microcontroller data 277 via volatile memory medium 250.

Figure 3:
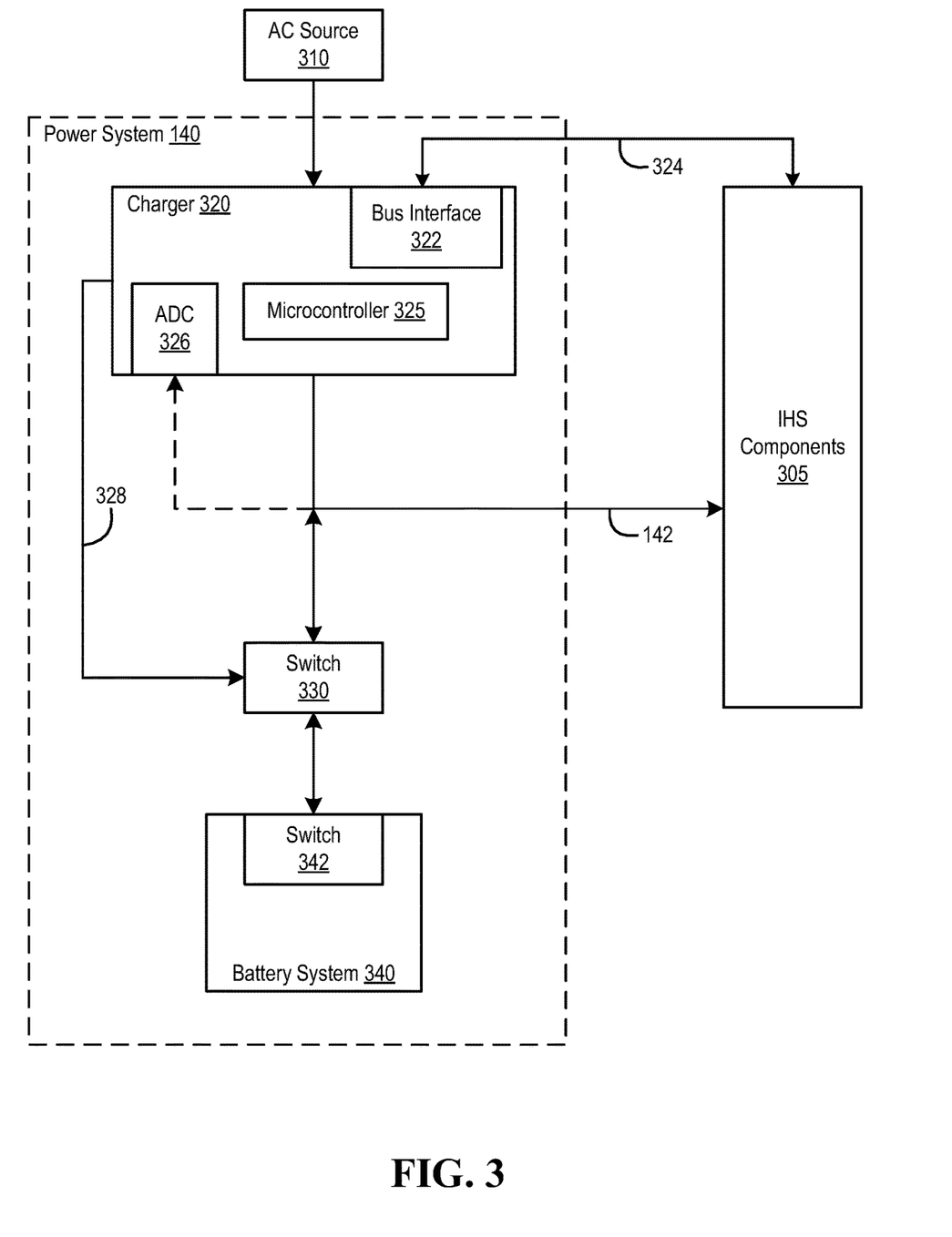
FIG. 3 illustrates an example of a power system, according to one or more embodiments.

Turning now to FIG. 3, an example of a power system is illustrated, according to one or more embodiments. In one or more embodiments, power system 140 may receive alternating current (AC) power 310. In one example, AC power 310 may be or include one hundred and twenty volts AC (120 VAC). For instance, AC power 310 may provide electrical power at 120 VAC. In another example, AC power 310 may be or include two hundred and forty volts AC (240 VAC). For instance, AC power 310 may provide electrical power at 240 VAC.

In one or more embodiments, power system 140 may provide electrical power to IHS components 305. For example, IHS components 305 may include one or more of a motherboard, processor 120, EC 130, volatile memory medium 150, non-volatile memory media 160 and 170, I/O subsystem 175, and network interface 180, among others. In one or more embodiments, power system 140 may include a charger 320. In one example, charger 320 may include a bus interface 322, which may be utilized in communications via a bus 324. In one instance, bus interface 322 may be or may include a SMBus interface. In another instance, bus 324 may be or may include a SMBus. In a second example, charger 320 may include a microcontroller 325. For instance, microcontroller 325 may include one or more structures and/or one or more functionalities as those described with reference to microcontroller 210. In another example, charger 320 may include an analog to digital converter (ADC) 326. In one or more embodiments, microcontroller 325 may include one or more of bus interface 322 and ADC 326, among others.

In one or more embodiments, microcontroller 325 may executes instructions in implementing at least a portion of one or more systems, at least a portion of one or more flowcharts, at least a portion of one or more methods, and/or at least a portion of one or more processes described herein. In one example, microcontroller 325 may executes instructions that may cause charger 320 to implement at least a portion of one or more systems, at least a portion of one or more flowcharts, at least a portion of one or more methods, and/or at least a portion of one or more processes described herein. In another example, microcontroller 325 may executes instructions that may cause power system 140 to implement at least a portion of one or more systems, at least a portion of one or more flowcharts, at least a portion of one or more methods, and/or at least a portion of one or more processes described herein.

In one or more embodiments, ADC 326 may determine one or more voltage values associated with electrical power output 142. For example, ADC 326 may provide digital data, based at least on the one or more voltage values associated with electrical power output 142, to microcontroller 325. For instance, ADC 326 may determine one or more digital voltage values associated with electrical power output 142. In one or more embodiments, power system 140 may include a switch 330. For example, switch 330 may conduct electrical power from a battery system 340 to electrical power output 142 and may prohibit conducting electrical power from battery system 340 to electrical power output 142. For instance, switch 330 may conduct electrical power from battery system 340 to electrical power output 142 and may prohibit conducting electrical power from battery system 340 to electrical power output 142 based at least on one or more signals received via a control line 328. As an example, charger 320 may provide the one or more signals to switch 330 via a control line 328. As another example, microcontroller 325 may provide the one or more signals to switch 330 via control line 328.

In one or more embodiments, power system 140 may include battery system 340. For example, battery system 340 may store energy. In one instance, battery system 340 may store chemical energy, which may be converted to electrical energy that may be provided to one or more components of IHS 110. In another instance, battery system 340 may receive electrical energy that may be converted to stored chemical energy, which may be utilized at a later time as electrical energy. In one or more embodiments, battery system 340 may include a switch 342 that may be utilized to control access to energy stored by battery system 340. In one example, switch 342 may conduct electrical energy. In another instance, switch 342 may prohibit conducting electrical energy.

Figure 4:
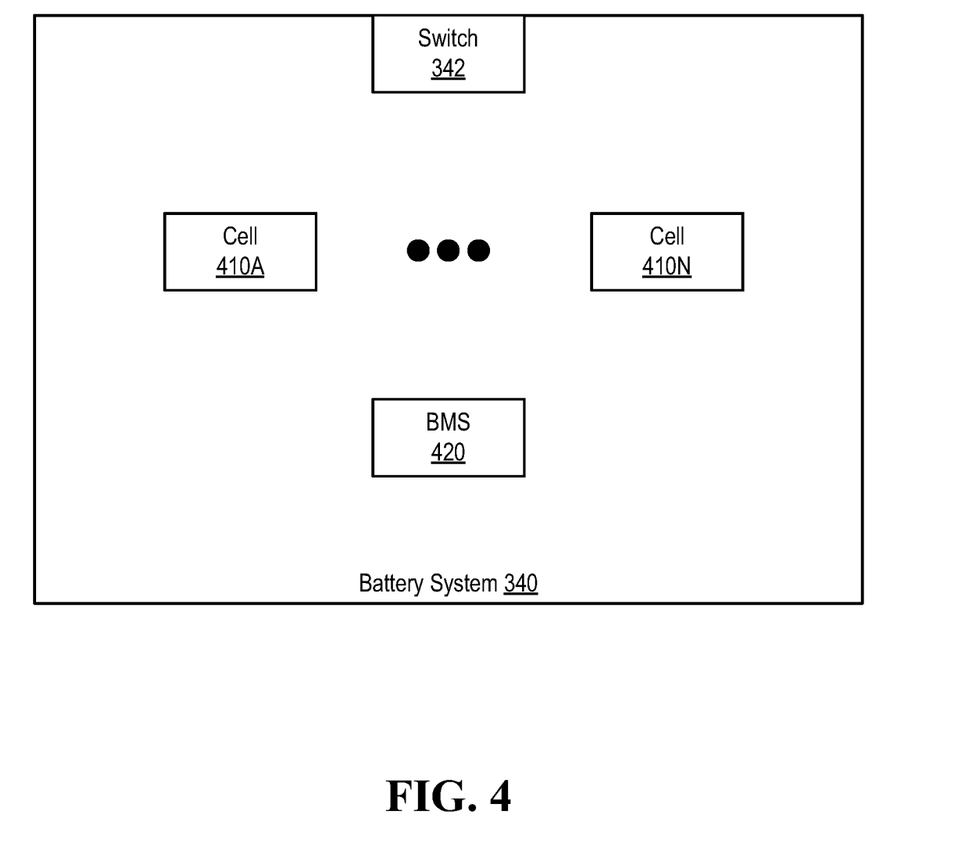
FIG. 4 illustrates an example of a battery system, according to one or more embodiments.

In one or more embodiments, a switch (e.g., switch 330, switch 342, etc.) may include one or more transistors. For example, the one or more transistors may include one or more bipolar junction transistors (BJTs), one or more field effect transistors (FETs), one or more junction field effect transistors (JFETs), and/or one or more metal-oxide-silicon field effect transistors (MOSFETs), among others.

In one or more embodiments, AC power 310 may introduce "noise" into power system 140. For example, "noise" may be a general term for unwanted and/or unknown modifications that an electrical signal and/or electrical power may suffer during transmission and/or reception. For instance, "noise" may also be used to mean one or more electrical signals that are random and/or unpredictable, which provide no useful information and/or are disruptive to an electrical system or electronics.

In one or more embodiments, one or more systems, one or more methods, and/or one or more processes described herein may be utilized to reduce or eliminate noise introduced via AC power 310. For example, battery system 340 may be utilized to mitigate or eliminate noise introduced via AC power 310 during a peak power draw event occurs in IHS 110. For instance, the one or more systems, the one or more methods, and/or the one or more processes described herein may extend an amount of time that battery system 340 is utilized after a peak power draw event occurs. As an example, the method may extend an amount of time that switch 330 is on. For instance, extending the amount of time that switch 330 is on may be utilized to permit battery system 340 to provide additional electrical power to one or more of processor 120 and GPU 122, among others. As an example, a peak power draw event of IHS 110 may include utilizing or entering a "turbo" mode of IHS 110.

In one or more embodiments, charger 320 may control switch 330. In one example, charger 320 may control switch 330 (e.g., turn on and turn off switch 330) via a bus. For instance, the bus may be or include a SMBus. In another example, charger 320 may control switch 330 (e.g., turn on and turn off switch 330) via control line 328. In one or more embodiments, charger 320 may turn on switch 330 when IHS 110 is in a turbo mode. In one or more embodiments, charger 320 may turn on switch 330 when a voltage value associated with electrical power output 142 is less than a voltage value associated with an output voltage value of battery system 340. For example, charger 320 may turn on switch 330 when additional electrical power is needed from battery system 340 to provide to IHS components 305.

Turning now to FIG. 4, an example of a battery system is illustrated, according to one or more embodiments. In one or more embodiments, battery system 340 may include cells 410A-410N. In one example, a cell 410 may store chemical energy, which may be converted to electrical energy. In another example, a cell 410 may receive electrical energy that may be converted to stored chemical energy, which may be utilized at a later time as electrical energy. In one or more embodiments, a cell 410 may be or include a lithium ion rechargeable cell. Although cells 410A-410N are illustrated, battery system 340 may include any number of cells 410. In one or more embodiments, cells 410 may be arranged in any configuration of series and/or parallel. For example, cells 410 may be arranged in a four cell series (4S) and three parallel (3P) configuration.

In one or more embodiments, battery system 340 may include a battery management system (BMS) 420. For example, BMS 420 may be or may include a microcontroller. For instance, BMS 420 may include one or more structures and/or one or more functionalities as those described with reference to microcontroller 210. In one or more embodiments, BMS 420 may manage charging and/or discharging cells 410 of battery system 340. For example, BMS 420 may control switch 342. In one instance, BMS 420 may control switch 342 such that switch 342 conducts electrical energy (e.g., turning on switch 342). In another instance, BMS 420 may control switch 342 such that switch 342 prohibits conducting electrical energy (e.g., turning off switch 342).

In one or more embodiments, BMS 420 may include one or more analog to digital converters (ADCs). For example, the one or more ADCs (not specifically illustrated) may monitor one or more voltage values of one or more cells 410. In one instance, the one or more ADCs may monitor one or more voltage values of one or more cells 410 to load balance and/or charge balance one or more of cells 410. In another instance, the one or more ADCs may monitor one or more voltage values of one or more cells 410 to prevent undue wear to one or more of cells 410. In another instance, the one or more ADCs may monitor one or more voltage values of one or more cells 410 to prevent damage to one or more of cells 410. As an example, BMS 420 may control switch 342 based at least on one or more digital voltage values from the one or more ADCs, which may determine one or more voltage values of one or more cells 410.

Figure 5:
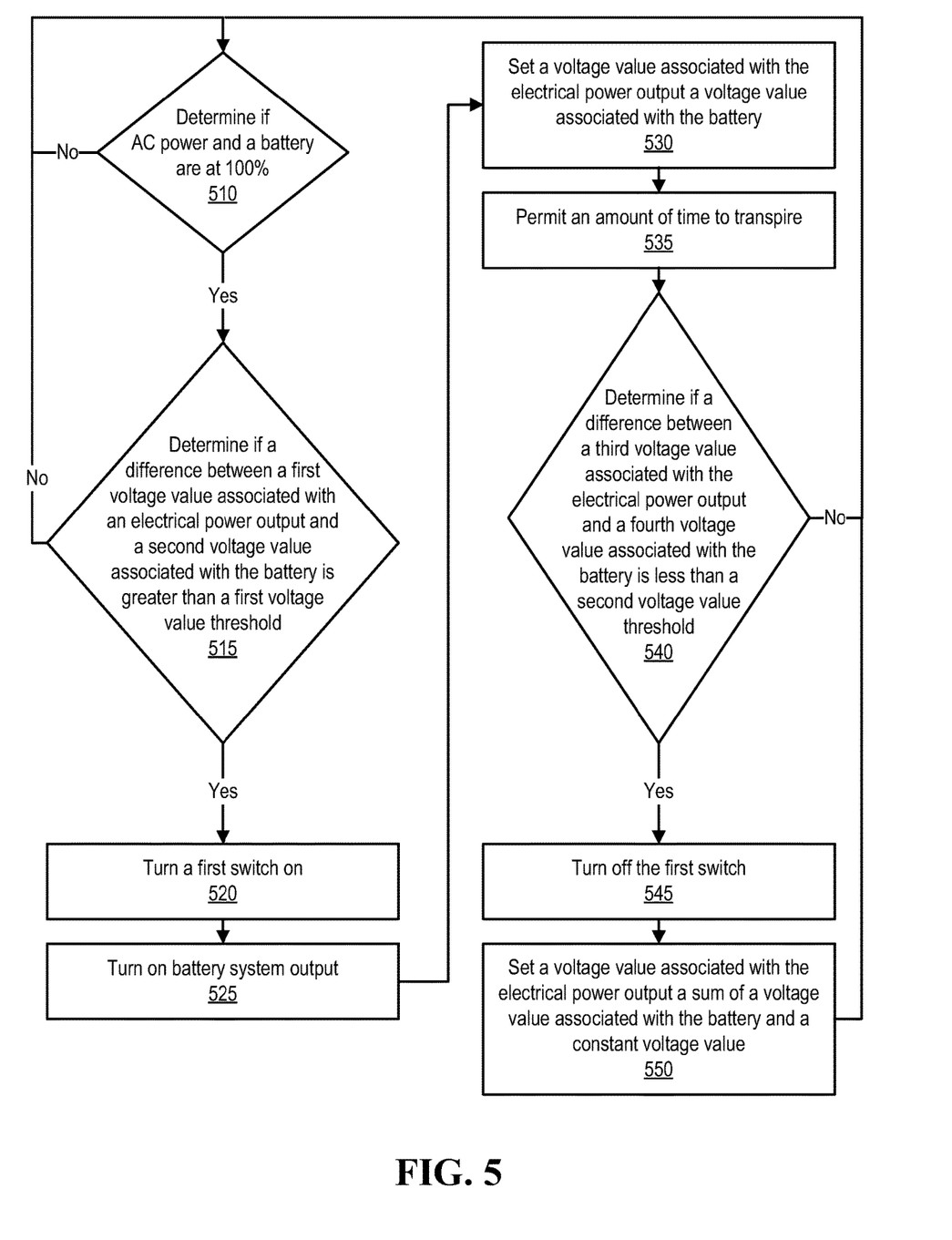
FIG. 5 illustrates an example of a method of operating a power system, according to one or more embodiments.

Turning now to FIG. 5, an example of a method of operating a power system is illustrated, according to one or more embodiments. At 510, it may be determined if AC power and a battery are at one hundred percent (100%). For example, it may be determined if AC source 310 and battery system 340 are at 100%. In one or more embodiments, microcontroller 325 may determine if AC power and a battery are at 100%. For example, microcontroller 325 may determine if AC source 310 and battery system 340 are at 100%.

If the AC power and the battery are not at 100%, the method may proceed to 510, according to one or more embodiments. For example, if AC source 310 and battery system 340 are not at 100%, the method may proceed to 510, according to one or more embodiments. In one instance, charger 320 may determine that the AC power and the battery are not at 100%, and may proceed to 510 in response. In another instance, microcontroller 325 may determine that the AC power and the battery are not at 100%, and may proceed to 510 in response. If the AC power and the battery are at 100%, it may be determined if a difference between a first voltage value associated with an electrical power output and a second voltage value associated with the battery is greater than a first voltage value threshold, at 515. For example, the first voltage value threshold may be one hundred and fifth millivolts (150 mV). In one or more embodiments, if the AC power and the battery are at 100%, it may be determined if a difference between a first voltage value associated with an electrical power output 142 and a second voltage value associated with battery system 340 is greater than the first voltage value threshold. In one example, if AC source 310 and battery system 340 are at 100%, charger 320 may determine if a difference between a first voltage value associated with electrical power output 142 and a second voltage value associated with battery system 340 is greater than the first voltage value threshold (e.g., 150 mV). In another example, if AC source 310 and battery system 340 are at 100%, microcontroller 325 may determine if a difference between a first voltage value associated with electrical power output 142 and a second voltage value associated with battery system 340 is greater than the first voltage value threshold (e.g., 150 mV).

If the difference between the first voltage value associated with the electrical power output and the second voltage value associated with the battery is not greater than the first voltage value threshold, the method may proceed to 510. For example, if the difference between the first voltage value associated with electrical power output 142 and the second voltage value associated with battery system 340 is not greater than the first voltage value threshold, the method may proceed to 510. In one instance, charger 320 may determine that the difference between the first voltage value associated with electrical power output 142 and the second voltage value associated with battery system 340 is not greater than the first voltage value threshold and may proceed to 510 in response. In another instance, microcontroller 325 may determine that the difference between the first voltage value associated with electrical power output 142 and the second voltage value associated with battery system 340 is not greater than the first voltage value threshold and may proceed to 510 in response.

If the difference between the first voltage value associated with the electrical power output and the second voltage value associated with the battery is greater than the first voltage value threshold, a first switch may be turned on, at 520. For example, if the difference between the first voltage value associated with electrical power output 142 and the second voltage value associated with battery system 340 is greater than the first voltage value threshold, switch 330 may be turned on. In one or more embodiments, turning on the first switch may include conducting electrical power from the battery to the electrical power output. For example, turning on switch 330 may include conducting electrical power from battery system 340 to electrical power output 142. In one instance, turning on switch 330 may include charger 320 controlling switch 330 to conduct electrical power from battery system 340 to electrical power output 142. In another instance, turning on switch 330 may include microcontroller 325 controlling switch 330 to conduct electrical power from battery system 340 to electrical power output 142. As an example, charger 320 may control switch 330, via a control line 328, to conduct electrical power from battery system 340 to electrical power output 142. As another example, microcontroller 325 may control switch 330, via a control line 328, to conduct electrical power from battery system 340 to electrical power output 142. In one or more embodiments, turning on the first switch may be performed in response to determining that the difference between the first voltage value associated with the electrical power output and the second voltage value associated with the battery is greater than the first voltage value threshold.

At 525, battery system output may be turned on. In one example, battery system 340 output may be turned on. In another example, a second switch associated with the battery may be turned on. For instance, switch 342 may be turned on. In one or more embodiments, turning on the second switch may include conducting electrical power from the battery to the first switch. For example, turning on battery system 340 output may include conducting electrical power from battery system 340 to switch 330.

At 530, a voltage value associated with the electrical power output may be set to a voltage value associated with the battery. For example, a voltage value associated with electrical power output 142 may be set to a voltage value associated with battery system 340. In one instance, charger 320 may set the voltage value associated with electrical power output 142 to the voltage value associated with battery system 340. In another instance, microcontroller 325 may set the voltage value associated with electrical power output 142 to the voltage value associated with battery system 340. In one or more embodiments, the voltage value associated with battery system 340 may be a voltage value associated with an output voltage value of battery system 340.

At 535, an amount of time may be permitted to transpire. For example, microcontroller 325 may an amount of time to transpire. For instance, the amount of time may be one second. In one or more embodiments, the amount of time may be configured. For example, the amount of time may be configured based at least on one or more periods of time of providing additional electrical power to IHS components 305. For instance, the amount of time may be configured based at least on one or more periods of time between entering and exiting a "turbo" mode of IHS 110. As an example, during a turbo mode of IHS 110 one or more of IHS components 305 may utilize additional electrical power in processing information.

At 540, it may be determined if a difference between a third voltage value associated with the electrical power output and a fourth voltage value associated with the battery is less than a second voltage value threshold. For example, it may be determined if a difference between a third voltage value associated with electrical power output 142 and a fourth voltage value associated with battery system 340 is less than a second voltage value threshold. In one instance, charger may determine if the difference between the third voltage value associated with electrical power output 142 and the fourth voltage value associated with battery system 340 is less than the second voltage value threshold. In another instance, microcontroller 325 may determine if the difference between the third voltage value associated with electrical power output 142 and the fourth voltage value associated with battery system 340 is less than the second voltage value threshold. In one or more embodiments, the second voltage value threshold may be fifty millivolts (50 mV).

If the difference between the third voltage value associated with the electrical power output and the fourth voltage value associated with the battery is not less than the second voltage value threshold, the method may proceed to 510. For example, if the difference between the third voltage value associated with electrical power output 142 and the fourth voltage value associated with battery system 340 is not less than the second voltage value threshold, the method may proceed to 510. In one instance, microcontroller 325 may determine that the difference between the third voltage value associated with electrical power output 142 and the fourth voltage value associated with battery system 340 is not less than the second voltage value threshold and may proceed to 510 in response. In another instance, microcontroller 325 may determine that the difference between the third voltage value associated with electrical power output 142 and the fourth voltage value associated with battery system 340 is not less than the second voltage value threshold and may proceed to 510 in response.

If the difference between the third voltage value associated with the electrical power output and the fourth voltage value associated with the battery is less than the second voltage value threshold, the first switch may be turned off, at 545. For instance, if the difference between the third voltage value associated with electrical power output 142 and the fourth voltage value associated with battery system 340 is less than the second voltage value threshold, the first switch may be turned off. In one instance, charger may determine that the difference between the third voltage value associated with electrical power output 142 and the fourth voltage value associated with battery system 340 is less than the second voltage value threshold and may turn off switch 330 in response. In another instance, microcontroller 325 may determine that the difference between the third voltage value associated with electrical power output 142 and the fourth voltage value associated with battery system 340 is less than the second voltage value threshold and may turn off switch 330 in response.

In one or more embodiments, turning off the first switch may include prohibiting conducting electrical power from the battery to the electrical power output. For example, turning off switch 330 may include prohibiting conducting electrical power from battery system 340 to electrical power output 142. For instance, turning off switch 330 may include microcontroller 325 may controlling switch 330 to prohibit conducting electrical power from battery system 340 to electrical power output 142. As an example, charger 320 may control switch 330, via control line 328, to prohibit conducting electrical power from battery system 340 to electrical power output 142. As another example, microcontroller 325 may control switch 330, via control line 328, to prohibit conducting electrical power from battery system 340 to electrical power output 142. In one or more embodiments, turning off the first switch may be performed in response to determining that the difference between the third voltage value associated with the electrical power output and the fourth voltage value associated with the battery is less than the second voltage value threshold.

At 550, a voltage value associated with the electrical power output may be set to a sum of a voltage value associated with the battery and a constant voltage value. For example, a voltage value associated with electrical power output 142 may be set to a sum of a voltage value associated with battery system 340 and a constant voltage value. In one instance, charger may set the voltage value associated with electrical power output 142 to a sum of the voltage value associated with battery system 340 and the constant voltage value. In another instance, microcontroller 325 may set the voltage value associated with electrical power output 142 to a sum of the voltage value associated with battery system 340 and the constant voltage value. In one or more embodiments, the constant voltage value may be one hundred and fifth millivolts (150 mV). In one or more embodiments, the voltage value associated with battery system 340 may be a voltage value associated with an output voltage value of battery system 340. In one or more embodiments, charger 320 may control switch 330, via control line 328, to prohibit conducting electrical power from battery system 340 to electrical power output 142. In one or more embodiments, microcontroller 325 may control switch 330, via control line 328, to prohibit conducting electrical power from battery system 340 to electrical power output 142. In one or more embodiments, the method may proceed to 510.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor;
   a memory medium, coupled to the at least one processor, that stores an operating system and at least one application executable by the at least one processor; and
   a power system that includes a charger and a battery system;
   wherein the charger includes a microcontroller that executes instructions, which cause the power system to:
      determine that a difference between a first voltage value associated with an electrical power output of the power system and a second voltage value associated with the battery system is greater than a first voltage value threshold;
      turn a first switch on to conduct electrical power from the battery system to the electrical power output of the power system;
      set a voltage value associated with the electrical power output to a voltage value associated with the battery system;
      after setting the voltage value associated with the electrical power output, permit an amount of time to transpire;
      after the amount of time transpires, determine that a difference between a third voltage value associated with the electrical power output and a fourth voltage value associated with the battery system is less than a second voltage value threshold; and
      turn the first switch off to prohibit conducting electrical power from the battery system to the electrical power output of the power system.

2. The information handling system of claim 1, wherein the instructions executed by the microcontroller further cause the power system to:
   set the voltage value associated with the electrical power output to a sum of the voltage value associated with the battery system and a constant voltage value.

3. The information handling system of claim 2, wherein the constant voltage value is fifty millivolts (50 mV).

4. The information handling system of claim 1, wherein the instructions executed by the microcontroller further cause the power system to:
   determine that an alternating current (AC) power input to the information handling system and the battery system are at one hundred percent (100%).

5. The information handling system of claim 1, wherein the first voltage value threshold is one hundred and fifty millivolts (150 mV).

6. The information handling system of claim 1, wherein the amount of time is one second.

7. The information handling system of claim 1, wherein the information handling system is configured to be readily carried by a user.

8. The information handling system of claim 7, wherein the information handling system is at least one of a laptop computer system and a tablet computer system.

9. The information handling system of claim 1, wherein the instructions executed by the microcontroller further cause the power system to:
   after turning the first switch on, turn on a second switch of the battery system to conduct electrical power from the battery system to the first switch.

10. The information handling system of claim 1,
    wherein the power system further includes an analog to digital converter; and
    wherein the instructions executed by the microcontroller further cause the power system to determine, via the analog to digital converter, the first voltage value associated with the electrical power output of the power system.

11. A method, comprising:
    determining that a difference between a first voltage value associated with an electrical power output of a power system of an information handling system and a second voltage value associated with a battery system of the information handling system is greater than a first voltage value threshold;
    turning a first switch on to conduct electrical power from the battery system to an electrical power output of the power system;
    setting a voltage value associated with the electrical power output to a voltage value associated with the battery system;
    after the setting the voltage value associated with the electrical power output, permitting an amount of time to transpire;
    after the amount of time transpires, determining that a difference between a third voltage value associated with the electrical power output and a fourth voltage value associated with the battery system is less than a second voltage value threshold; and
    turning the first switch off to prohibit conducting electrical power from the battery system to the electrical power output of the power system.

12. The method of claim 11, further comprising:
    setting the voltage value associated with the electrical power output to a sum of the voltage value associated with the battery system and a constant voltage value.

13. The method of claim 12, wherein the constant voltage value is fifty millivolts (50 mV).

14. The method of claim 11, further comprising:
   determining that an alternating current (AC) power input to the information handling system and the battery system are at one hundred percent (100%).

15. The method of claim 11, wherein the first voltage value threshold is one hundred and fifth millivolts (150 mV).

16. The method of claim 11, wherein the amount of time is one second.

17. The method of claim 11, wherein the information handling system is configured to be readily carried by a user.

18. The method of claim 17, wherein the information handling system is at least one of a laptop computer system and a tablet computer system.

19. The method of claim 11, further comprising:
   after the turning the first switch on, turning on a second switch of the battery system to conduct electrical power from the battery system to the first switch.

20. The method of claim 11, further comprising:
   determining, via an analog to digital converter, the first voltage value associated with the electrical power output of the power system.

\* \* \* \* \*